United States Patent [19]
Al-Hawaj

[11] Patent Number: 5,395,483
[45] Date of Patent: Mar. 7, 1995

[54] ROTARY APPARATUS FOR COMBINED MULTI FLASHING AND BOILING LIQUIDS

[76] Inventor: Osamah M. Al-Hawaj, P.O. Box 5969, Safat - 13060, Kuwait

[21] Appl. No.: 923,306

[22] Filed: Jul. 31, 1992

[51] Int. Cl.⁶ .................. B01D 1/26; B01D 1/16; B01D 1/22; B01D 3/06
[52] U.S. Cl. ......................... 159/2.3; 159/3; 159/6.2; 159/6.3; 159/28.4; 159/DIG. 8; 159/DIG. 16; 159/18; 202/173; 202/174; 202/177; 202/187; 203/72; 203/88; 203/90
[58] Field of Search ............ 159/18, 2.3, 3, 6.2, 159/6.3, 28.4, DIG. 8, DIG. 16, DIG. 39; 202/173, 174, 236, 177, 185.5, 185.6, 187; 203/88, 72, 90, DIG. 20

[56] References Cited

U.S. PATENT DOCUMENTS

| | | | |
|---|---|---|---|
| 909,028 | 1/1909 | Schalitz | 159/18 |
| 1,145,728 | 7/1915 | Wiegand | 159/18 |
| 1,799,478 | 4/1931 | Peebles | 159/2.3 |
| 2,210,926 | 8/1940 | Hickman | 159/18 |
| 2,290,209 | 7/1942 | Rosenthal | 159/18 |
| 2,894,879 | 7/1959 | Hickman | 202/174 |
| 3,930,958 | 1/1976 | Maruichi | 159/18 |

*Primary Examiner*—Thomas M. Lithgow
*Attorney, Agent, or Firm*—Ladas & Parry

[57] ABSTRACT

A distillation apparatus by flashing and boiling of solution and condensing the resulting steam having a central rotating partitioned brine conduit with coupling to a two-disk centrifugal distributor and a wiping blade system in a chamber having at least one conically shaped wall heated by a condensing steam in a spirally formed conduit, and a surrounding annular spiral condenser. The vertical stacking of such conically shaped evaporators and annular spiral condensers with brine inflow and outflow through a central rotating partitioned tubular conduit make up the desalination tower. The solution flowing through the central tubular conduit to the centrifugal distributor is pressurized by the centrifugal force before flashing through spray nozzles. The flowing liquid film formed on the heated conical surface boils with further enhancement from thinning action due to a rotating wiping pivoting blade system. The vapor formed by flashing and boiling is partly condensed in a surrounding annular spiral condenser by a counter current feed and partly used as a heating steam in a succeeding lower temperature stage. The condensed vapor in the spiral heating conduit and the annular condenser form the pure distillate product and the remaining brine flows downward through slots in the central conduit to the next vessel.

17 Claims, 12 Drawing Sheets

ROTARY APPARATUS FOR COMBINED MULTI FLASHING AND BOILING LIQUIDS

BACKGROUND OF THE INVENTION

This invention is an improvement over the existing art for evaporation or distillation of solutions by the well known methods of multi stage flash, MSF, and multi effect boiling of liquids, MEB, with prime application in the desalting of sea and brackish water. This invention may also be used as a concentration apparatus to separate part of the liquid, or distillation to separate the different ingredients present in a solution mixture.

In conventional method for distillation of water based on evaporation the major cost is divided approximately evenly between costs of energy and capital costs. In the MEB method of distillation, the energy efficiency of an evaporation process is inversely proportional to the temperature difference, $\Delta T$, between the condensing steam and the boiling aqueous solution. Similarly, in the MSF method the energy efficiency of flashing is inversely proportional to pressure difference, $\Delta P$, between two successive stages. In practice there is a limit on how small the temperature and pressure differential per stage used because of the increased cost associated with additional surface area (both material and fabrication).

It is an object of the present invention to improve the energy efficiency by decreasing the temperature and pressure differential between two successive stages. Thus, the object of this invention is an apparatus that is both energy efficient and capital efficient.

A further object is to provide a modular apparatus that is easy to construct, assemble and simple to maintain.

A further object is to provide a distillation apparatus that is capable of harnessing wind energy.

A further object is to provide an apparatus that has the flexibility to operate in different modes.

A further object of this invention is a distillation apparatus that is highly adaptable for dual purpose plants.

A further object is to reduce the problem of evaporator scaling and water contamination present in conventional plants.

A further object of this invention is to provide a distillation apparatus that is compact and utilizes small space for installation which makes it suitable for use on board ships, in farms and residential areas.

SUMMARY OF THE INVENTION

According to one aspect of the present invention, an apparatus is provided for combined adiabatic flashing and film boiling of liquids in stages of vertically disposed coaxial vessels with central rotating partitioned tubular conduit and a method comprising the steps of:

a) Sea water is introduced into the reservoir on the top of the evaporator column and flows downward by gravity through the central rotating partitioned tubular conduit to the centrifugal distributor in the first vessel.

b) The liquid in the circular distributor is further pressurized by the effect of the centrifugal force due to rotation and forced to flow outward through spray nozzles distributed equally around the outer periphery of the said distributor.

c) The liquid issuing from the nozzles impinges on the cylindrical wall of the vessel, partly flashes as vapor and partly forms a flowing liquid film on the conical wall section of the said vessel.

d) The flowing liquid film is made thinner by a self-adjusting pivoting rotating blade system which enhances boiling by decreasing the thermal resistance between the brine film and a heating steam from an external source flowing through a spiral conduit on the bottom wall of the conical section of the said vessel.

e) Vapor product formed by flashing and boiling effects is withdrawn through an outlet or a set of outlets on the upper side of the cylindrical wall of the said vessel.

f) The remaining liquid collects at the bottom of the conical part of the vessel, and flows through a set of small slots on the wall of the central tubular conduit to the next vessel by gravity and aided by the pressure difference that exists between the two vessels.

g) The withdrawn vapor in (e) is partly directed to the condenser/preheater to be condensed while heating the sea water feed and partly directed to the spiral conduit in the conical wall of the next lower temperature vessel. The withdrawn vapor division is controlled by a system of two valves or equivalently controlled by a three-way valve. The vapor condensed in the preheater/condenser and that condensed in the spiral heating coil form the pure water distillate product.

h) The steps a to g are repeated with further vessels if necessary.

According to the present invention in another aspect, an apparatus is provided for use in carrying out the above method by a plurality of vessels stacked one above another. The wall of each vessel is comprised of two coaxial conical wall elements joined at the periphery by a third cylindrical wall element. In one alternate configuration the cylindrical wall element constitutes the inner cylindrical wall of an integral annular spiral preheater/condenser. Passing through the center of the vessels is a central rotating partitioned tubular conduit which is internally coupled to a solid shaft and externally coupled to a circular two-disk distributor with spray nozzles at its periphery and a pivoting self-adjusting wiping blade system. The internal shaft partitions the central conduit within each vessel into two sections: an upper section serving as a conduit for brine or feed inflow to the vessel through a set of lateral slots surrounded by the distributor, and a lower section serving as a conduit for outflow of the brine from the vessel to the next lower vessel through another set of lateral slots near the bottom of the vessel.

One aspect of the present invention is an apparatus for desalination that is capable of operating in several modes. These modes are basically the multi stage flash, MSF, mode, the multi effect boiling, MEB, mode and the combined MSF and MEB mode. The selection of a particular mode of operation is achieved by both the controls of pressure level in the evaporator vessels using a vacuum pump and the control on the division of vapor removed from the vessel by a system of two valves or alternatively by a system of one three-way valve. The MSF mode of operation is achieved when sub atmospheric pressure is introduced in the evaporator vessels and the flashed vapor removed from each vessel is directed to the corresponding preheater/condenser. In the MEB mode of operation, the vessels are under normal pressure and the vapor removed by boiling is introduced into the spiral heating coil of the next succeeding vessel. In the combined mode of operation, the vessels are subjected to sub atmospheric pressure and the flashed and boiled vapor is partly directed to a preheater/condenser and partly to the spiral heating coil of the next vessel. The preheater/condenser can either be a separate conventional one or an annular spiral surrounding the evaporator vessel. The rotation of the central tubular conduit, although not essential for the operation of the evaporation process in any of the previously mentioned modes; it provides an option that enhances the evaporation process in each stage by inducing additional pressure differential and thereby increasing the vapor generation per unit volume. Thus, with rotation being an option, the number of possible modes of operation is increased from three to six, namely: MSF with or without rotation, MEB with or without rotation and combined MSF and MEB with or without rotation.

Another aspect of the present invention is an annular spiral condenser/preheater forming an integral part of the evaporator column which is comprised of a plurality of coaxial annular spiral condensers stacked one above another, in which its inner cylindrical wall encloses the evaporator vessel. The annular space is subdivided into two regions forming two spiral conduits: one upwardly spiral feed conduit and another downwardly spiral condensate conduit. Two consecutive stacked condensers are connected through an external joint connection for the feed and through an internal coincident slots for the condensate. The feed flow upward from one preheater to the next through an outer side connection, while condensed vapor flow downward by gravity from the bottom of one condenser to the top of the next through a common inlet/outlet slots. The vapor removed from the evaporator vessel and the spiral heating coil are directed to the condensation side of the annular preheater/condenser either internally from the inner wall or externally from the outer cylindrical wall.

Another aspect of the present invention is the use of a set of inclined flying pivoting blade wipers with a restraining spring coupled to the central rotating tubular conduit. The purpose of such wiping blades is to form on the conical wall an extremely thin liquid film layer of brine having a small thermal resistance and thereby enhancing the evaporation rate when operating in MEB mode. Another aspect of the blade system is a self-adjusting control on the wiping blade-surface friction under variable speed conditions achieved by a self-correcting force balance between the spring tension and the blade centrifugal force.

Other aspects of the present invention are two alternate configurations for stationary central brine conduit. In one configuration the central brine conduit is comprized of a set of pipe segments coupled together through circular disk partitions. In a second configuration the central brine conduit is made up of discontinuous flange and pipe segments. In both configurations the central shaft is eliminated.

Another aspect of the present invention is a vertical mult-stage evaporator in which the rotation of the central tubular brine conduit is derived from coupling either the upper or lower or both ends of the central shaft to rotating machineries. For two-end coupling of the central shaft control must be provided for controlled engagement and disengagement of couplings such that the central shaft is driven only by one rotating machinery at a time.

Another aspect of the present invention is an evaporator apparatus that is capable of being driven by a vertical axis wind turbine through direct coupling of the upper end of the central shaft or indirect coupling using a flywheel-pulley belt drive. The lower end of the shaft is, coupled to an electric motor to be engaged when the wind speed is not sufficient enough to drive the central shaft. The object of rotation is to induce additional pressure differential in the centrifugal distributor and to reduce the thermal resistance of the flowing brine film by wiping action.

BRIEF DESCRIPTION OF THE DRAWINGS

Some embodiments of the invention will now be described with reference to the accompanying drawings in which:

FIG. 2b is a side view of FIG. 2a.

FIG. 2c is a bottom section view of FIG. 2a.

DESCRIPTION OF PREFERRED EMBODIMENTS

Figure 1:
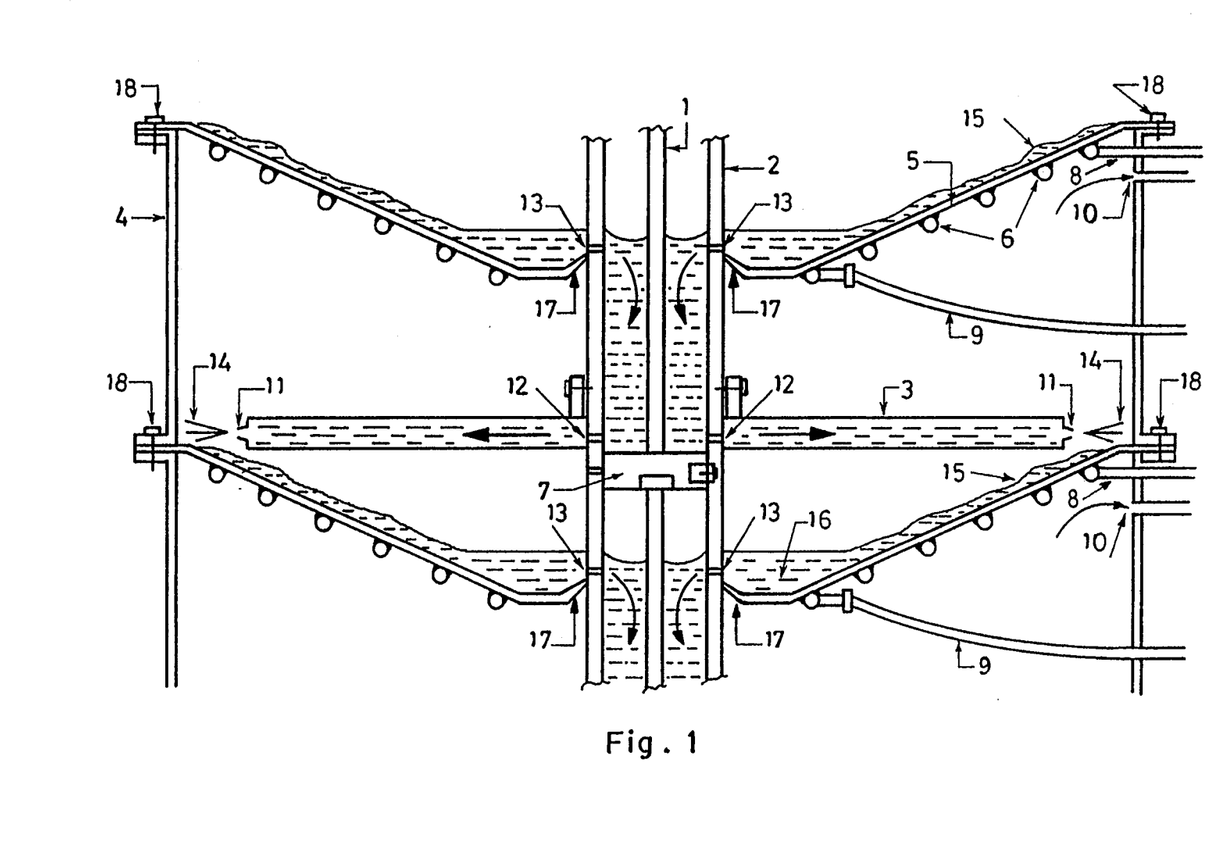
FIG. 1 is a vertical section of an intermediate stage of the evaporator of the present invention.

As shown in FIG. 1, the evaporator walls of an intermediate vessel consists of three wall members; two conical downward converging coaxial members 5 and joined at the outer periphery by a third cylindrical member 4. The three wall elements are fixed at peripheral edges by a set of bolts 18. A spiral heating coil 6 is bonded to the bottom of each conical wall member. The spiral heating coil 6 is supplied with steam from an external supply in the first vessel or vapor generated from a preceding vessel through a conduit 8. The outlet of the spiral coil 6 is connected to a conduit 9, which can be partly flexible for easy assembly, to be used for piping away condensate to the preheater/condenser. A central rotating conduit 2 which is coupled internally to a central shaft 1 passes through the center of the vessel. There are two sets of slots on the surface of the central tubular conduit within each vessel providing inlet and outlet of brine to and from the vessel respectively. One set of slots 12 supply brine to the vessel through a distributor 3 and nozzles 11, and a second set of slots 13 located near the bottom of the vessel remove the collected brine from the said vessel to the next succeeding vessel by gravity effect. The centrifugal distributor 3 which is coupled and fixed externally to the central conduit is comprized of two circular disks closed at the outer periphery except for a plurality of equally spaced spray nozzles 11. Vapor generated within the said vessel is removed through an outlet 10 in upper side of the cylindrical wall. The solution or dispersion is fed through the central rotating tubular conduit 2 from an upper vessel to the centrifugal distributor 3 through a set of slots 12. The solution in the centrifugal distributor is subjected to an increase in pressure due to rotation before flowing through spray nozzles 11 to space of the said vessel as jet spray 14 impinging on the cylindrical wall. This spray jet partly evaporates and partly flows as a liquid film 15 on the bottom conical wall of the vessel that is heated by a condensing vapor from a preceding vessel in a spiral conduit bonded to its bottom. Finally the remainder of the brine collects near the bottom of the vessel 16 to flow by gravity and aided by the pressure differential between two stages to the next vessel through another set of slots 13 on the surface of the central tubular conduit. The water vapor generated by flashing and boiling is removed through an outlet 10 in the side of upper part of cylindrical wall, which when condensed forms the pure product distillate.

Figure 2A:
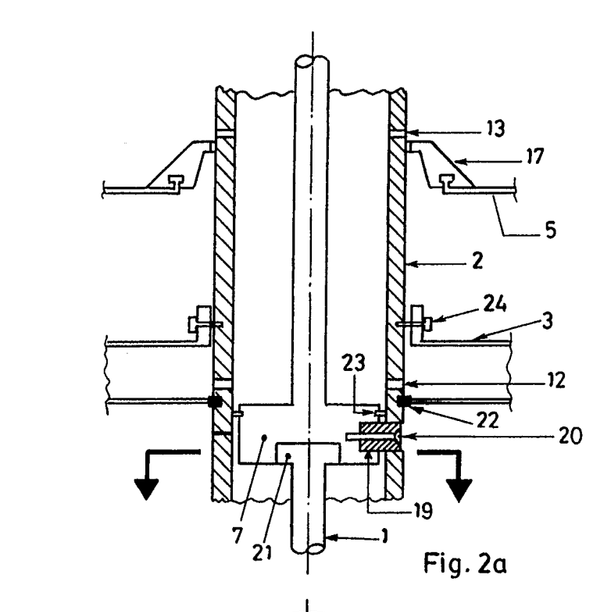
FIG. 2a is a vertical section showing the shaft-central conduit coupling, two shaft segment coupling, central conduit-distributor coupling and the seals used in the present invention.
Figure 2B:
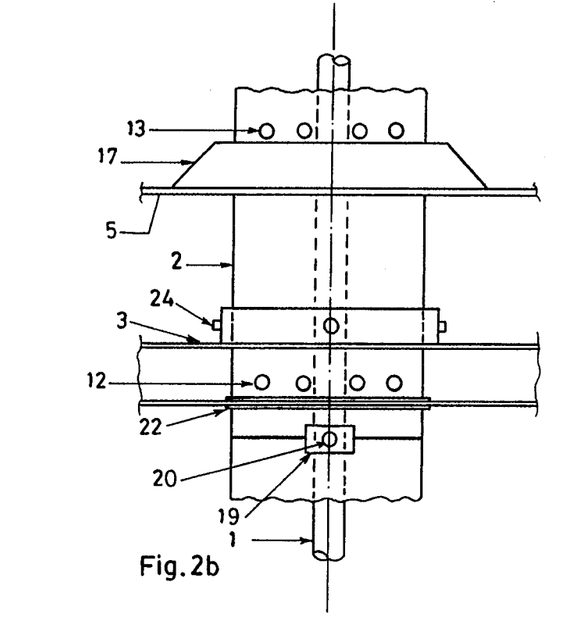
Figure 2C:
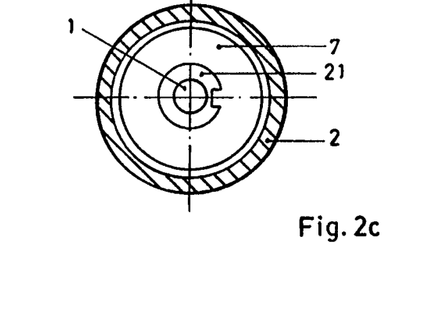

In FIG. 2(a,b,c) the preferred tubular conduit-shaft coupling and sealing arrangement used in the present invention are illustrated. The whole shaft is comprised of a number of smaller shaft segments equal to the number of vessels plus one. Each shaft segment extends from the middle of one vessel to the middle of the next. Connections between two shaft segments are obtained by splined connections, in which the upper end 21 comprising a key and the lower end 7 comprising a hub. One possible splined connection between two shaft segments is shown in the FIG. 2. The central tubular conduit is comprized of a number smaller tubular conduit segments in parallel with shaft segments. The shaft and central conduit coupling is accomplished using a sunk key 19 and a pin bolts 20. An O-ring seal 23 is used in the lower end of the shaft segment to prevent leakage of brine through the clearance between lower end of shaft segment and the inner surface of the tubular conduit. The distributor 3 is coupled to the surface of the central conduit through its upper disk by bolts 24, while its lower disk is closely fitted by an O-ring seal 22.

One aspect of the present invention is the use of a conical tapered flexible seal 17 to provide separation and prevent leakage between two succeeding vessels with minimum friction between the upper internal surface of the seal and the outer surface of the central conduit 2. The seal 17 has a conical cross-sectional shape with tapered upper end and thicker lower end that is closely fitted to the inner periphery of the conical bottom wall of the vessel. The difference in pressure between the upper and lower vessel is sufficient to generate the necessary force on the seal 17 such that its upper end with its small contact area is always in contact with the external central conduit surface, thus providing separation with least friction. Another aspect of this invention is to allow for a small clearance between the central rotating conduit and the conical wall inner periphery, and thereby allowing for small portion of the brine to by pass the centrifugal distributor to the next vessel without drastically affecting the performance.

Figure 3:
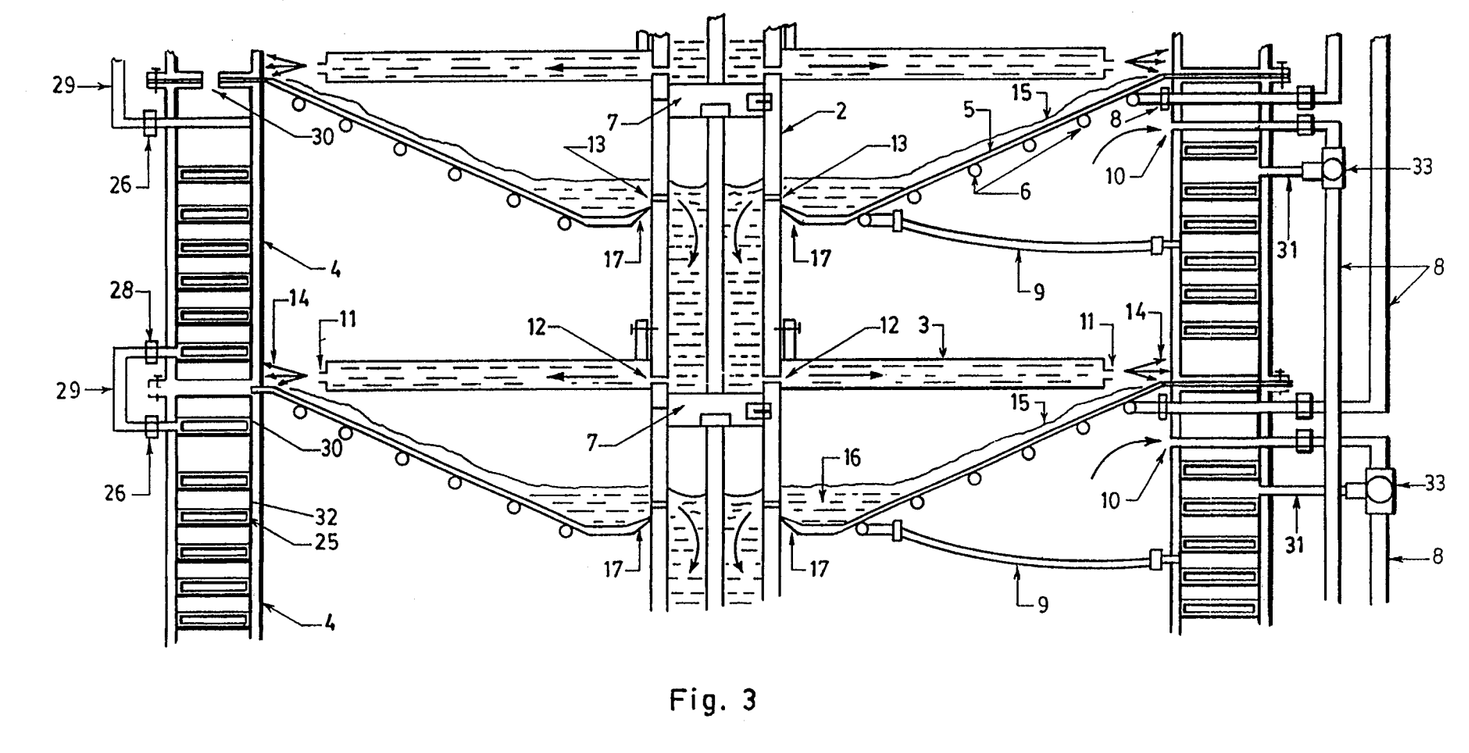
FIG. 3 is a vertical section of an intermediate stage of the evaporator with an integrated annular spiral preheater/condenser.

FIG. 3 shows an intermediate evaporator vessel with an integrated annular preheater/condenser at its periphery. The annular preheater/condenser is comprised of two coaxial cylindrical walls within which a spiral feed conduit 25 with rectangular cross-section wrapped around its inner wall with a lower inlet 28 and an upper outlet 26. Vapor removed from the vessel through an outlet or a set of outlets 10 on the upper side of the vessel passes to a three-way valve 33, which depending on its setting the vapor is divided into two portions. One portion passes through conduit 8 to a heating coil 6 located in the next vessel below while another portion passes through conduit 31 directly to the annular condenser/preheater, where it flows and condenses within the space 32 formed by the spiral feed conduit 25 while heating the feed. Condensing vapor received from line 31 and condensed vapor in the heating coil 6 of the upper vessel through line 9 together with the condensed vapor from the upper preceding preheater/condenser flow downward by gravity to the bottom of the annular space of the preheater/condenser and through outlet 30 to the next succeeding preheater/condenser. Sea water feed is heated while flowing upwardly and counter currently through the rectangular spiral conduit 25 and from a side outlet 28 through a connecting conduit 29 to the inlet 26 of the upper annular preheater/condenser.

Figure 4:
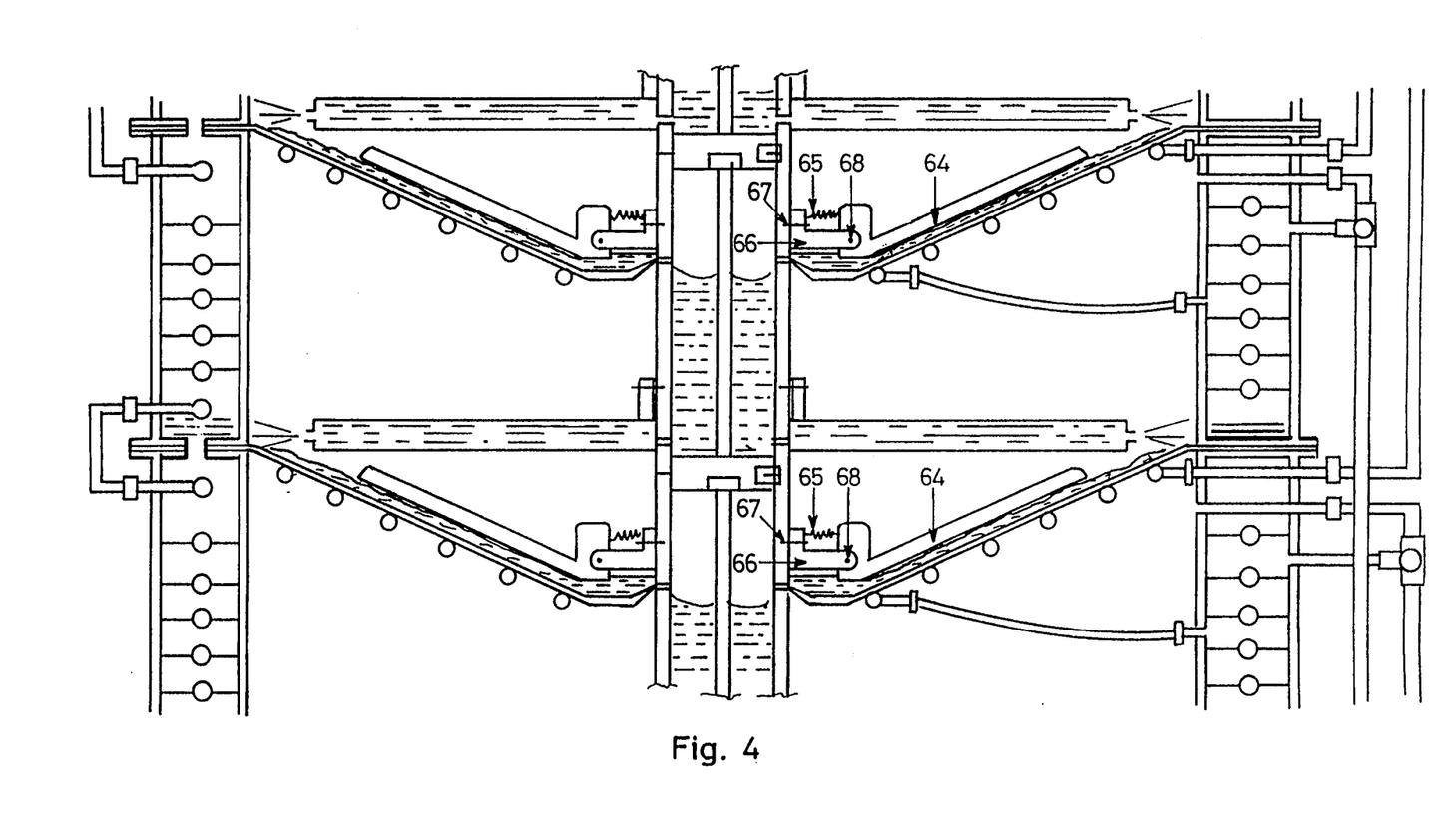
FIG. 4 is similar to FIG. 3 but illustrates the use of flying inclined pivoting blade wipers.

FIG. 4 is identical to FIG. 3 except for the inclusion of flying blade wipers which are coupled to the external surface of the rotating central tubular conduit. The wiping blade system consist of a distorted L shape blade arm 64 connected to through a pivoting pin 69 to a rigid bracket 66 which is fixed to the external surface of the central rotating conduit 2 by a set of bolts 67. Also the blades are restraint by a spring 65 which connect the flying blade wiper 64 from its base by a pivot 68 and the bracket 66. The advantage of this system is to provide a self correcting control on the friction force exerted by the wipers on the conical surface under variable rotational speed conditions specially during startup and shutdown or under variable speed setting. The effect of increased speed is to increase the centrifugal force which make the pivoting blade move outward in clockwise direction and thereby increases the friction on the conical surface, but this clockwise motion is counteracted by a restraining spring connected to the base of the L shape blade. The number of blades can be two or more and provided with flexible rubber at their edges in contact with conical surface.

Figure 5:
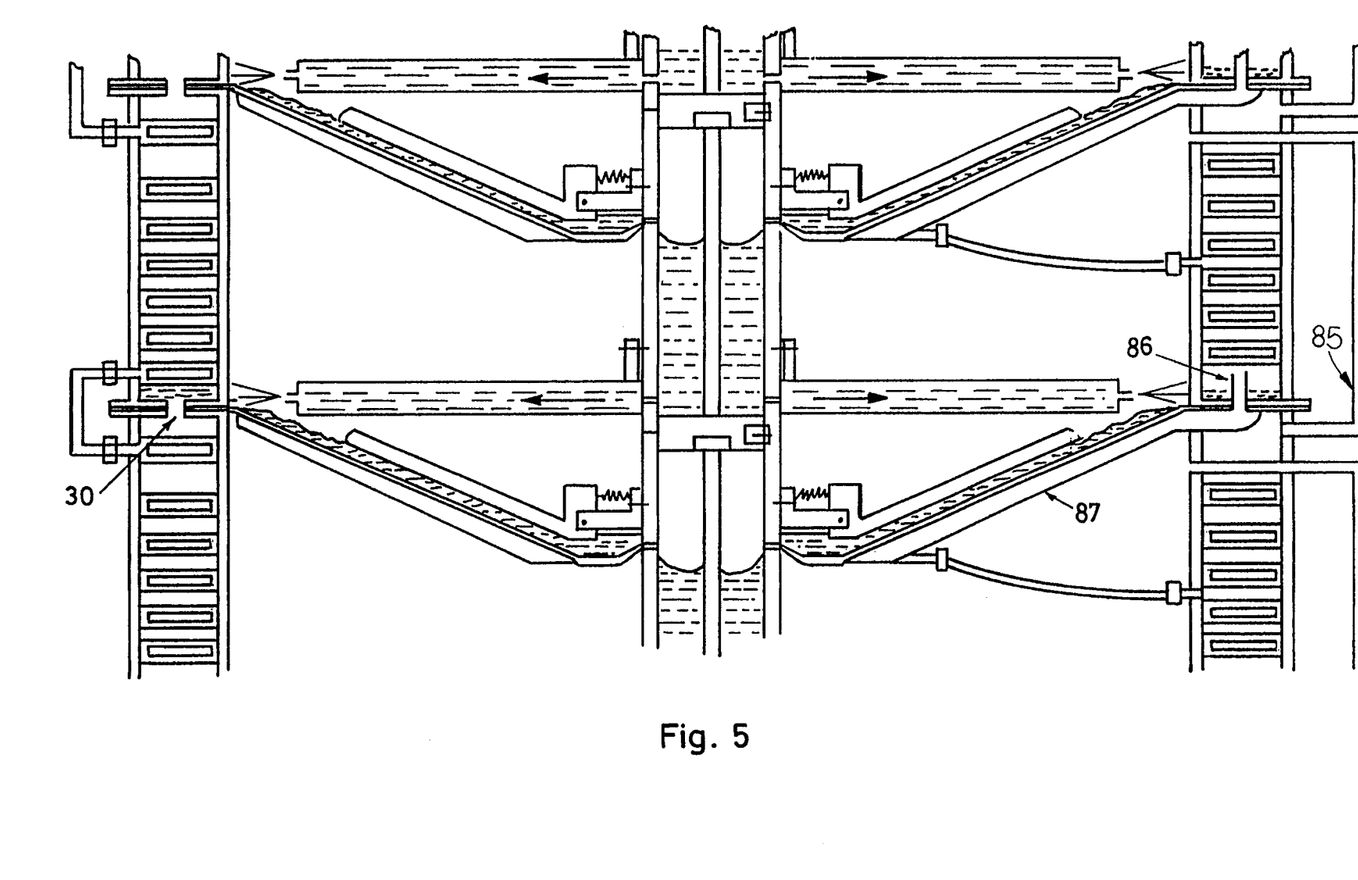
FIG. 5 a vertical section view of an intermediate evaporator stage with stationary continuous central brine conduit.

FIG. 5 is one alternate configuration of an evaporator with stationary central feed. In this configuration the central shaft is eliminated and the central tubular conduit is comprised of smaller pipe segments coupled together with use of a circular disk partition 69.

Figure 6:
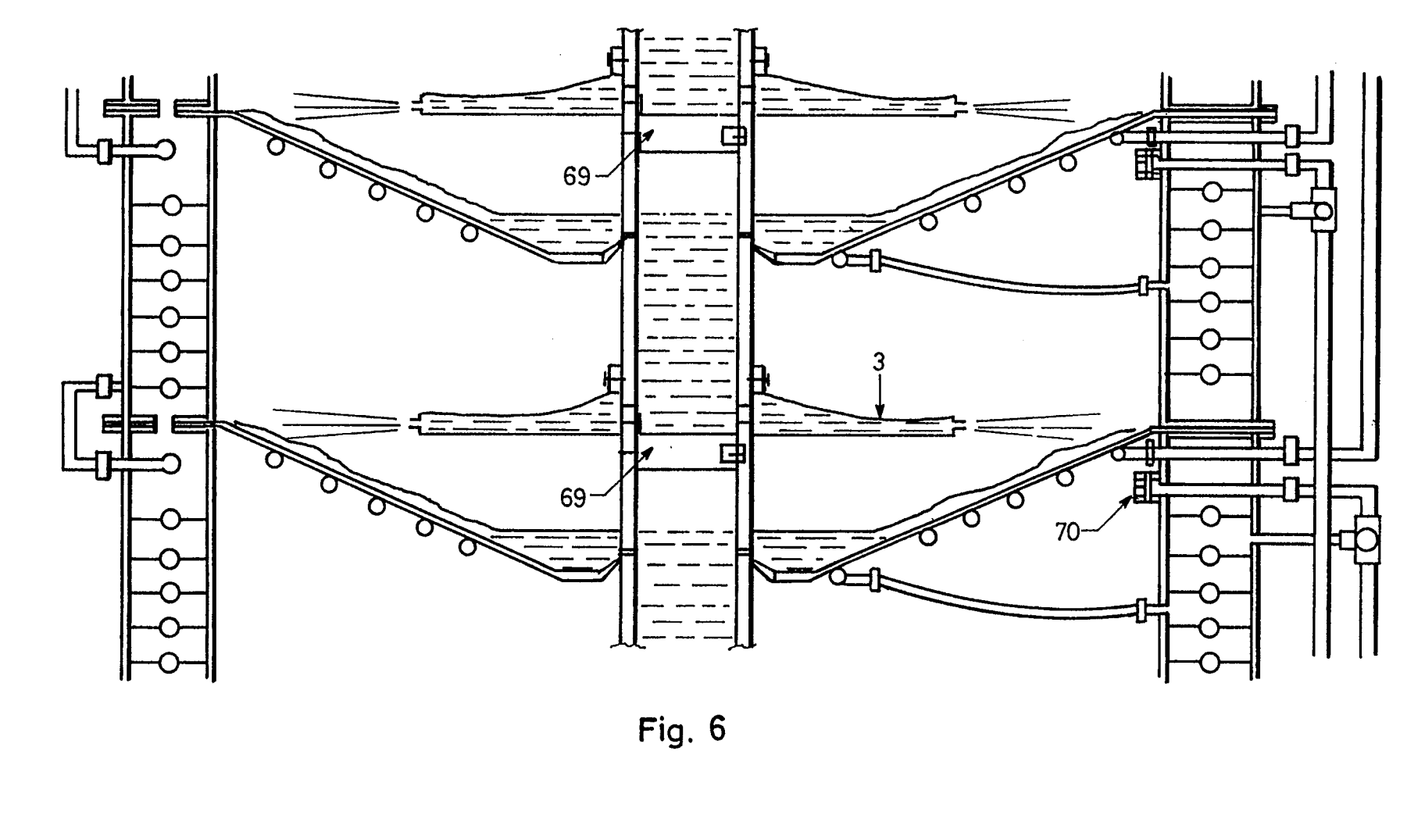
FIG. 6 is a second configuration of a vertical section view of an intermediate evaporator stage evaporator with stationary discontinuous central brine conduit.

FIG. 6 is a second alternate configuration of an evaporator with stationary central feed. In this configuration the central conduit is comprized of separate pipe segments 71 with an upper flange fixed to conical surface by fixed bolts 72.

Figure 7:
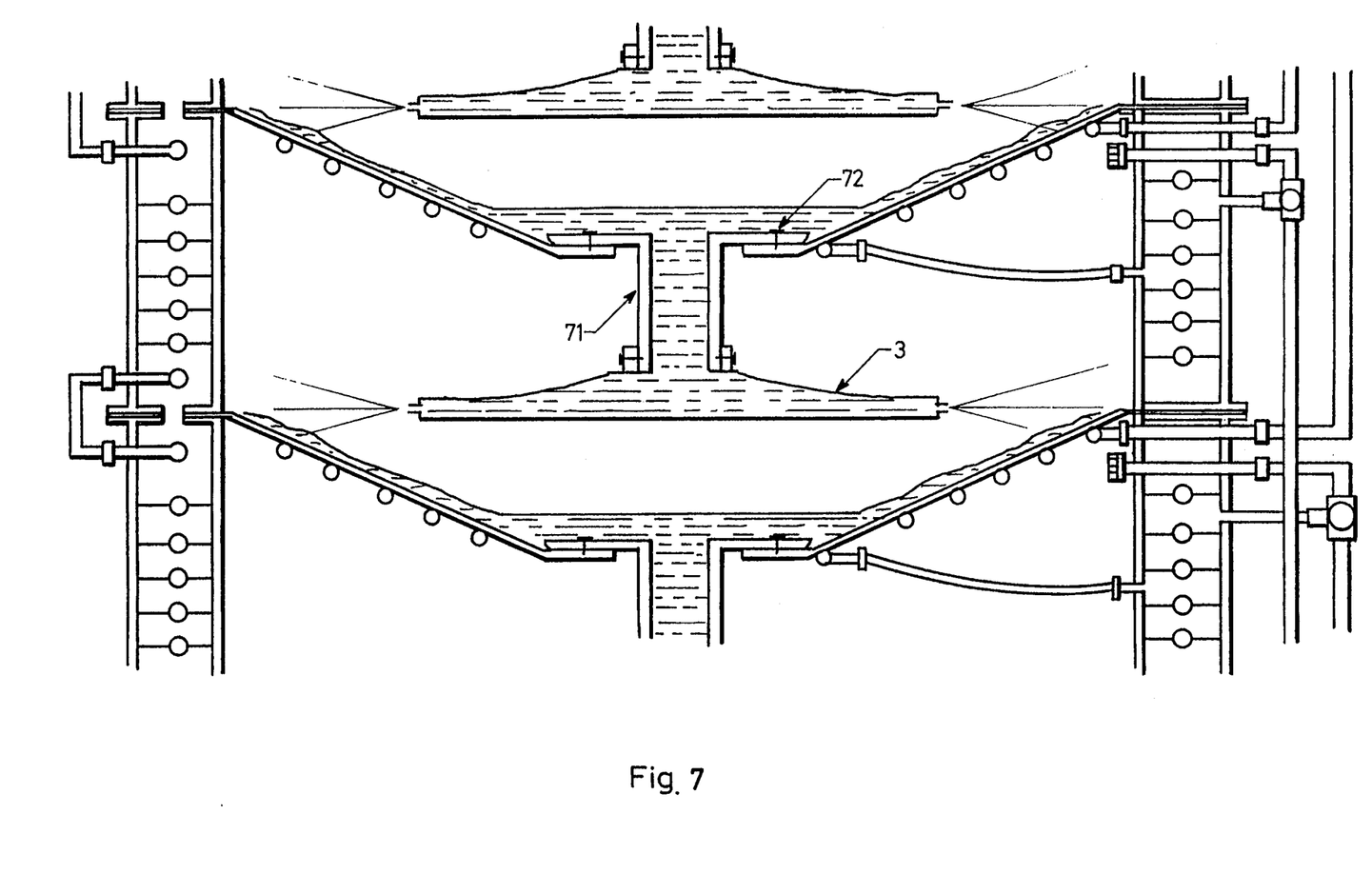
FIG. 7 is a vertical section of an intermediate stage of alternate evaporator with an integrated annular preheater/condenser operating in MSF mode.

FIG. 7 shows a special configuration of an intermediate evaporator vessel with an integrated annular preheater/condenser operating in MSF mode. In this alternate configuration the vapor which is generated by flashing is passed directly to the condensation side of the annular preheater/condenser through a set of outlets 10 on the upper side of the cylindrical wall protected from entrained brine droplets by a screen demisters (not shown). Also in this alternate configuration the spiral feed conduit 25 is of a circular cross-section with two side edges (fins) in contact with the inner and outer walls of the annulus, while the remaining annulus space 32 forms the downward spiral conduit for the counter current flowing condensate.

Figure 8:
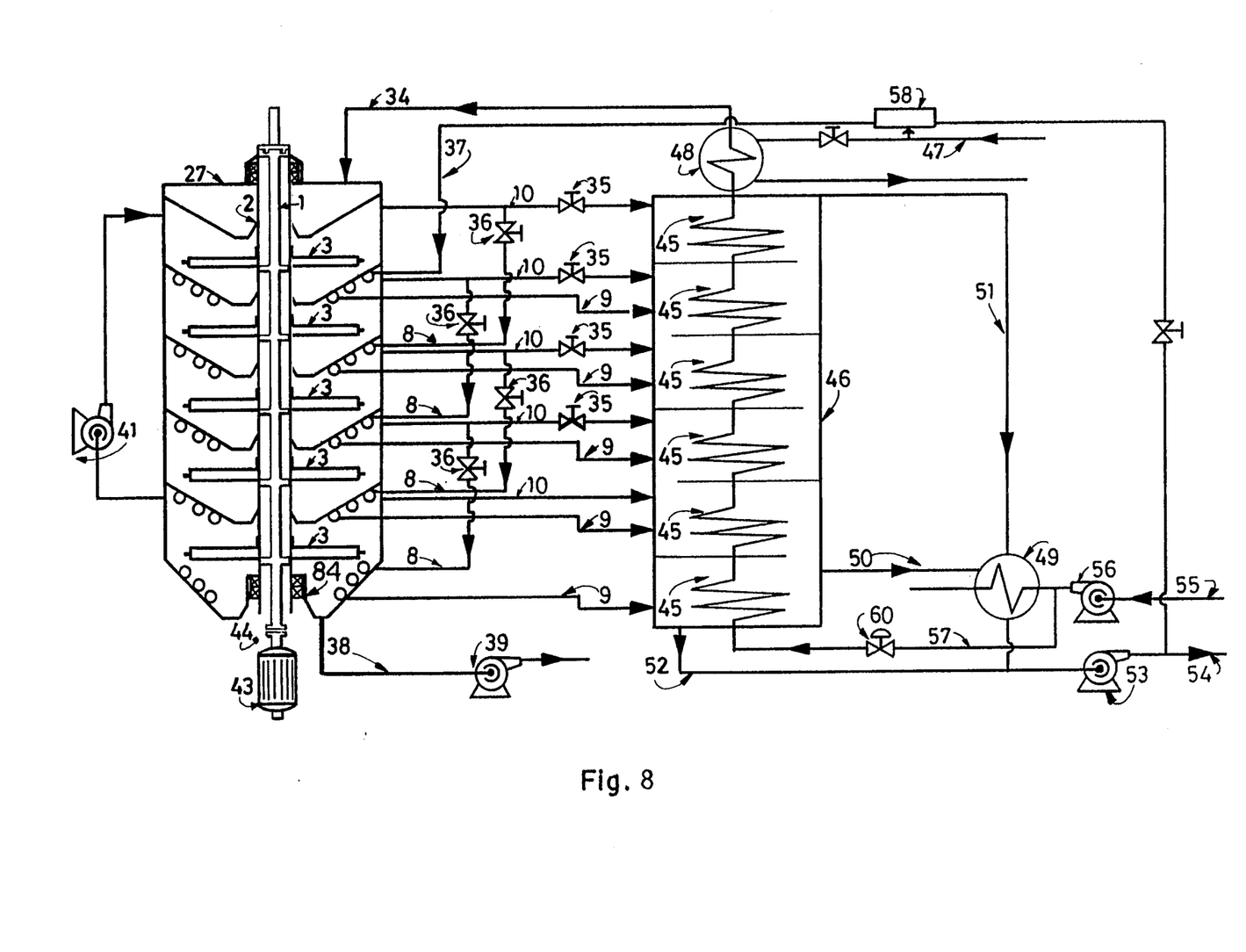
FIG. 8 is a vertical section of the multi-stage evaporator column of the present invention together with a separate condenser/preheater column in a diagrammatic form.

FIG. 8 shows the evaporator column 63 of the present invention together with other components that make up a desalination plant, which include a preheater/condenser column 46, blow down pump 39, feed pump 56, water distilled pump 53, vacuum pump 41, external heater 46, heat reject condenser 49, desuperheater 58, electric motor 43 and a number of valves. The pretreated sea water feed from line 55 is directed to the suction of feed pump 56. Then the outlet of the pump feed is divided into two streams, one stream passes through the heat reject condenser 49 and the second through line 57 and adjust valve 60 to the preheater column 46 through a set of preheaters 45. In the preheater column, the temperature of the feed is increased incrementally by the heat of condensation of vapor. The sea water feed leaving the preheater column is further given a final boost in temperature by an external heater (i.e. brine heater) 48 such as a low pressure heating steam 47. The heated sea water feed leaving the external heater through line 34 to a reservoir 27 located on the top of the evaporator column. The evaporator 63 is comprised of a set of coaxial vessels through which a rotating partitioned central conduit 2 passes. The central conduit is coupled to a shaft 1 driven by an electric motor 43 with coupling 44. Two sealed bearings, are used in connection with the rotation of the central tubular conduit 2: the top bearing 83 mounted on the upper wall of the reservoir and the bottom bearing, 84 mounted on the lower wall of the bottom vessel. The feed from reservoir 2 entering the central rotating tubular conduit 2 is subjected to centrifugal force in the distributor 3 which induces additional pressure to the feed before flashing through spray nozzles 11 at periphery of the distributor. The unflashed portion of the feed flows as a liquid film on the bottom conical downward converging wall, section of the vessel, and is further boiled by an external steam from line 37 through a heating coil 6. The remaining brine collected at the bottom of the vessel is withdrawn back to the central conduit pipe to the next succeeding vessel through a set of outlet slots 13. A similar process is repeated in each vessel with portion of the vapor generated from one vessel is used to boil more brine of the next vessel by flowing through a spiral heating coil 6. In the last vessel the brine collecting at the bottom of the vessel is withdrawn by line 38 and a blow down pump 39. The vapor resulting from flashing and boiling in each vessel is removed through line 10 which is controlled by two adjusting valves 35 and 36. The operational status of the set of valves 35 and 36 control the mode of operation of the desalination plant in the present invention. When the set of, valves 36 are closed and valves 35 are open, vapor passes directly from the vessels to the corresponding preheaters for condensation while heating the feed. In this mode of operation it resembles the operation of MSF plant. On the other hand, the reverse is true, that is with valves 35 being closed and valves 36 being open, vapor removed from one vessel is passed through line 8 to the heating coil 6 of the next vessel to boil the incoming brine which is at lower temperature and pressure, while at same time condenses in the coil and the condensate is removed through a flexible line 9 to the preheater/condenser 46. The two valves 35 and 36 can be replaced equivalently by a controlled three-way valve at the junction of lines 10 and 8. In this mode of operation it resembles an MEB plant. A third mode of operation that combines both MSF and MEB can be obtained when both set of valves 35 and 36 are open or partly open. In this mode of operation the vapor removed from one vessel is divided into two portions, one portion is directed to preheater/condenser for direct condensation and a second portion is directed to the heating coil of the next vessel. The vapor condensed as water distillate product in the preheater/condenser column 46 from all the stages flow downward by gravity and collect at the bottom of the column to be withdrawn through line 52 and distillate pump 53 to line 54. Part of the distillate product is used in the desuperheater 58 to produce a low pressure saturated steam in line 37. The uncondensed vapor and non condensable gases are removed from the preheater column through line 50 and 51 to the heat reject condenser 49. Pressure differences in the evaporator vessels is introduced in the evaporator vessels by means of a vacuum pump 41. Other means of introducing sub atmospheric pressure such as steam ejectors might be used instead.

Figure 9:
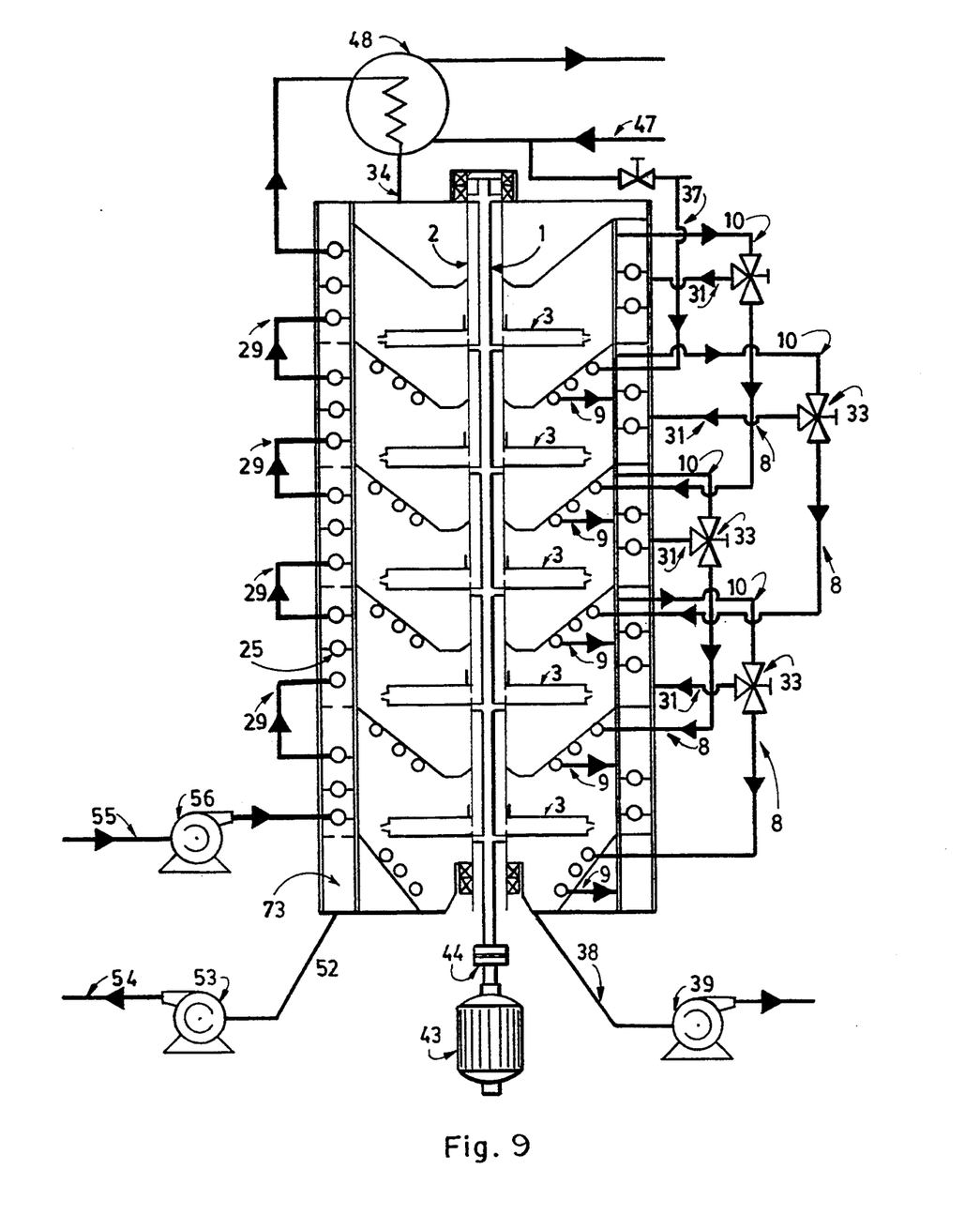
FIG. 9 is a vertical section of an alternate configuration of the multi-effect multi-stage evaporator column with an integrated annular preheater/condenser in a diagrammatic form corresponding to FIG. 3.

In FIG. 9 shows an alternate configuration in which the preheater/condenser is an integral component of the evaporator column. The condenser column is comprised of plurality of coaxial annular preheaters stacked one above another in parallel with evaporator vessels. Pretreated sea water is fed from line 55 by means of feed pump 56 to the preheater spiral conduit 25 in the lowest annular preheater/condenser and successively upward from one preheater to the next till the last upper preheater. During this flow the feed temperature is increased incrementally by the heat of condensation and finally through an external heater, a brine heater 48, where the feed temperature is raised further before it flows to the reservoir 27 on the top of the evaporator column. From the reservoir the sea water feed flow downward by gravity from one vessel to the next undergoing a sequence of boiling and flashing, and in the last vessel the brine is withdrawn through conduit 38 and a blow-down pump 39. The vapor removed through outlet 10 from evaporator vessels is controlled by a set of three-way valves 33, which depending on the setting of the valves the vapor is partly directed to the heating coil 6 where it condenses and flow by gravity through line 9 to the annular condenser to join the part of in the annular condenser. The vapor distillate product accumulated from the heating coil condensate 6, annular preheater condenser condensate and condensate from a preceding annular condenser collect at the bottom of each individual annular preheater/condenser to flow downward by gravity through outlet 30 to the next succeeding annular condenser bellow. Finally, the accumulated distillate product collect at the bottom reservoir 7 where it is removed through line 52 and a distillate pump 53.

Figure 10:
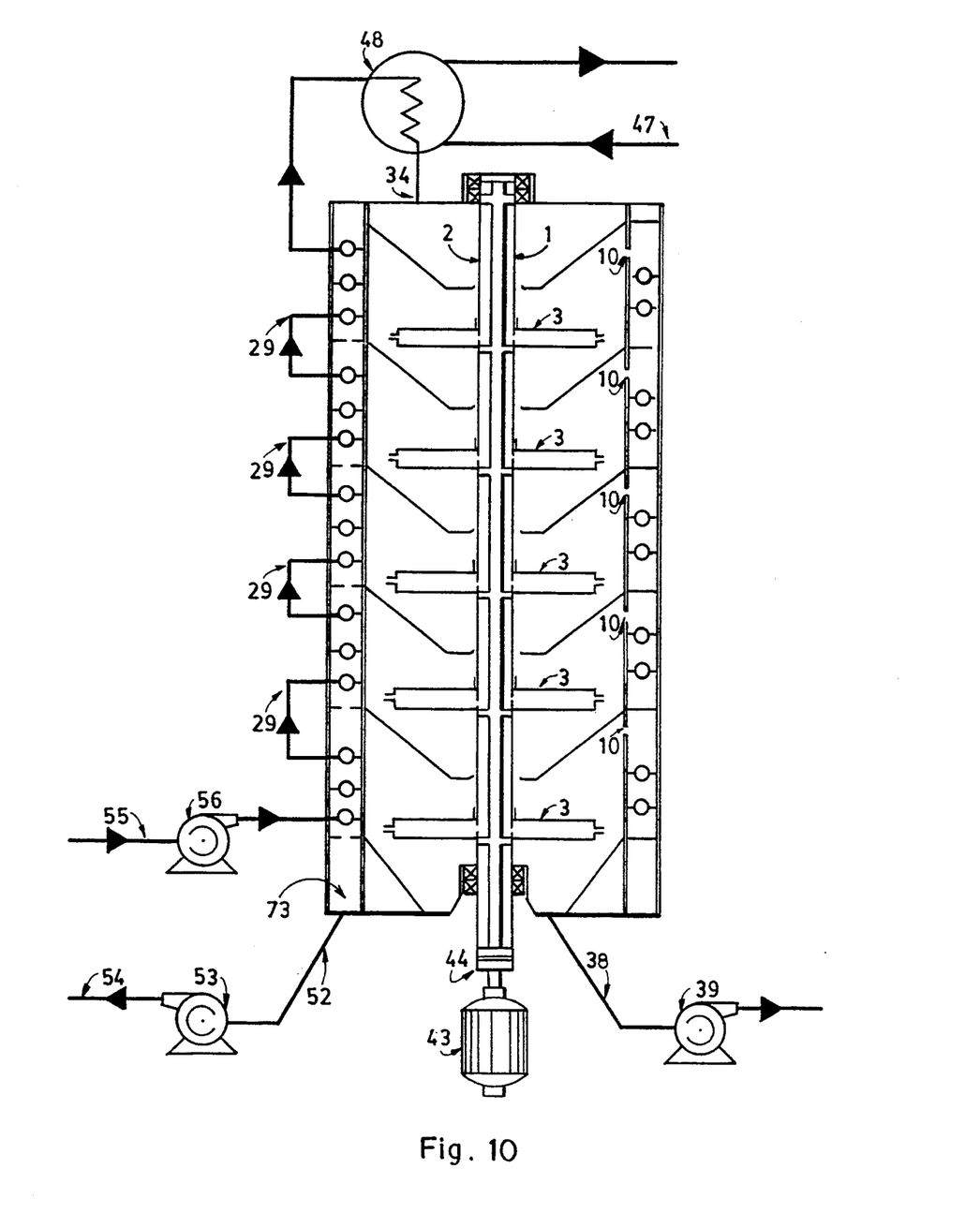
FIG. 10 is vertical section of alternate configuration of the multi-stage evaporator with integrated annular preheater/condenser operating in MSF mode corresponding to FIG. 7.

In FIG. 10 is a special case configuration of the evaporator/condenser column operating in MSF mode, only. In this case the vapor generated by flashing is removed through outlets 10 and from the inner wall of the annular preheater/condenser without resorting to external connections.

Figure 11:
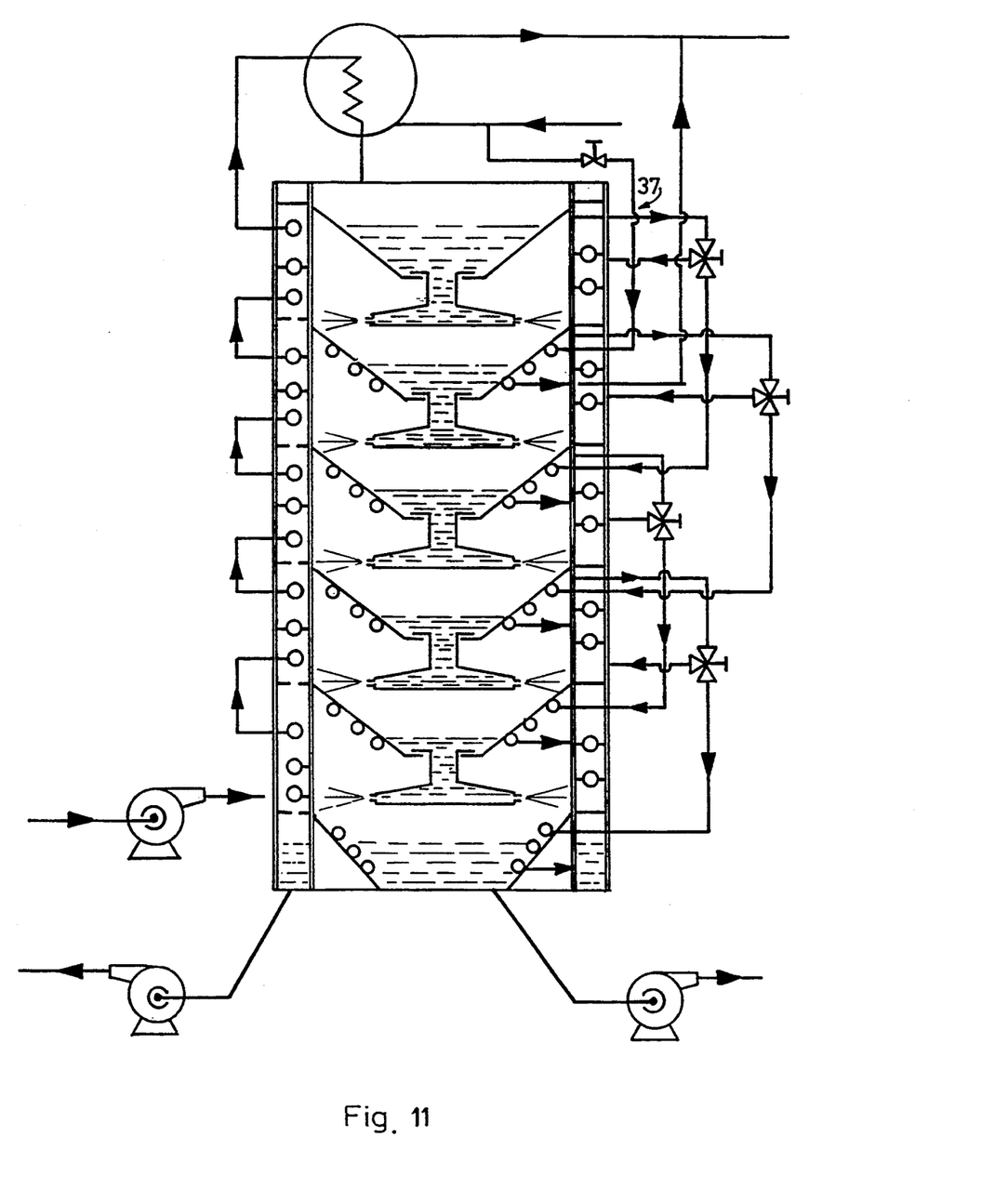
FIG. 11 is a vertical section of alternate configuration of the multi-effect multi-stage evaporator with stationary discontinuous central brine conduit corresponding to FIG. 6.

FIG. 11 is an evaporator/condenser configuration that employ a stationary central feed made up of separate central conduit pipe segments.

Figure 12:
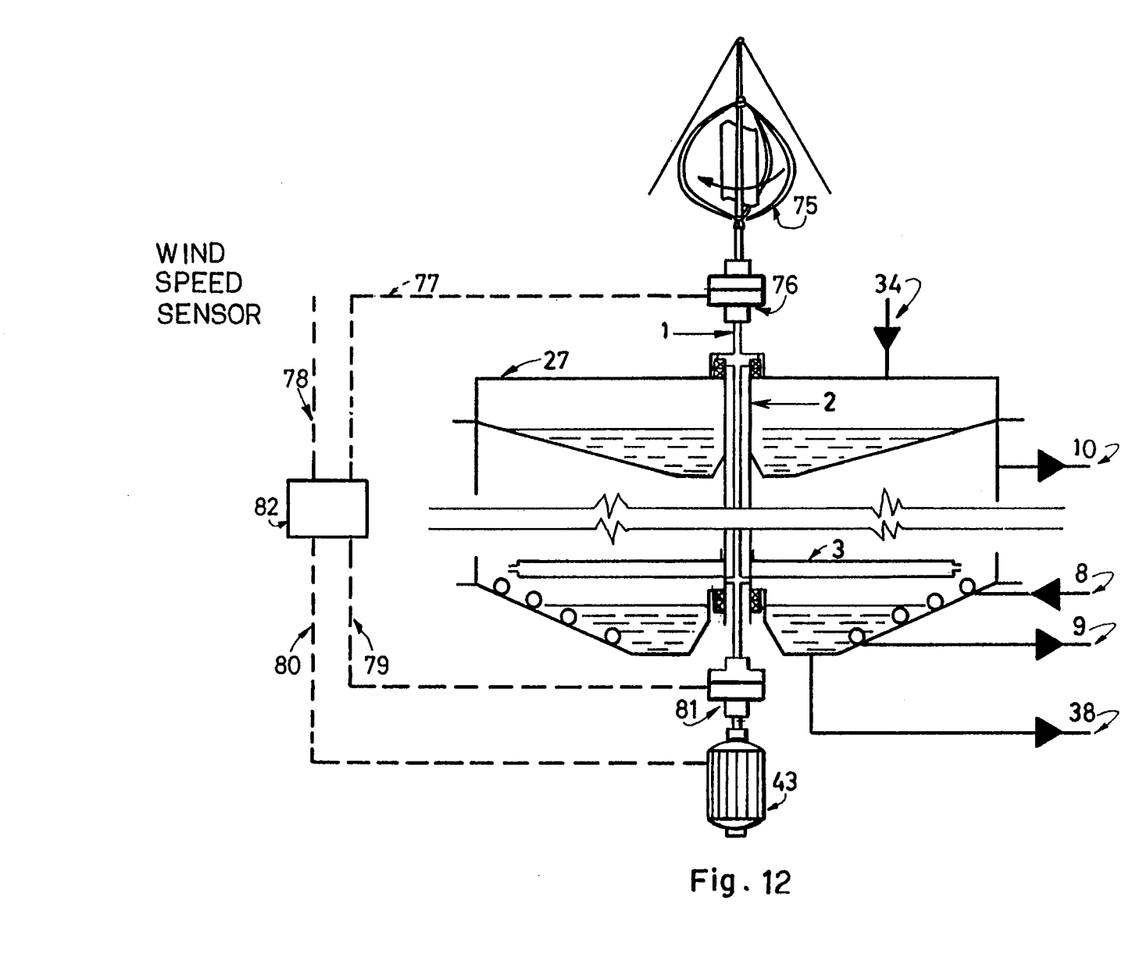
FIG. 12 is a vertical section of the upper portion of the upper stage and lower portion of the lower stage of the evaporator illustrating one possible two-end coupling that can be used in the present invention.

In FIG. 12 is an example of one possible two-end coupling of the central shaft. The upper end of the shaft 1 is coupled by a disengagable coupling 76 (i.e. a clutch) to a vertical axis wind turbine 75 (i.e. Darrieus-Savonius type), while the lower end of the central shaft coupled by another disengagable coupling 81 to an electric motor 43. The engagement and disengagement of couplings is provided through an external electronic controlling device 82 and control lines 77, 80 and 78. Line 77 is used to engage and disengage the upper coupling 76, line 79 is used to engage and disengage the lower coupling 81, line 80 is used to turn on/off the electric motor 43 and line 78 is connected to wind speed transducer for measuring the wind speed. Based on the wind speed information decision is made in the electronic device 82 as to which drive to be used. If the wind speed is sufficient enough, coupling 76 is engaged, coupling 81 is disengaged and the motor is, turned off. On the other hand, when the wind speed is decreased significantly, the motor coupling 81 is engaged, the motor is turned on and the upper coupling 76 is disengaged.

Having thus described my invention I claim:

1. An evaporator for concentrating a solution or for separating ingredients from a solution, said evaporator comprising a plurality of vertically stacked vessels with central conduit means for conveying the solution sequentially from one vessel to the next along a center axis of the evaporator, at least one of the vessels being formed by two conical downwardly converging coaxial walls joined together at the periphery by a cylindrical wall, said at least one vessel having an interior space which can be maintained at an initial pressure and distributor means associated with said interior space for subjecting solution conveyed to said at least one vessel by the central conduit means to a pressure which is greater than the initial pressure in the interior space and for distributing solution subjected to said greater pressure to the interior space for flashing, said at least one vessel comprising an outlet slot or slots communicating with the central conduit means, said distributor means comprising radial conduit means for distributing solution to the interior space such that unflashed solution within said at least one vessel gravitates to the conical walls, flows along the conical walls, through the outlet slot or slots and back into the central conduit means for conveyance to a succeeding vessel, the conical walls of said at least one vessel comprising heating means for boiling unflashed solution flowing therealong, said at least one vessel further comprising outlet means for removing vapor generated by said flashing and boiling of the solution.

2. An evaporator as claimed in claim 1 further comprising condenser means for condensing the vapor removed through the outlet means.

3. An evaporator as claimed in claim 1, wherein said central conduit means comprises a central tubular conduit which passes through each vessel and which is coupled to a central shaft having two ends, and being driven at least from one end of the shaft by rotating means to impart a rotating motion to the tubular conduit.

4. An evaporator as claimed in claim 3, wherein the central tubular conduit is partitioned into at least two segments within each vessel, wherein each vessel contains two sets of slots for communication between the central tubular conduit and each vessel, and wherein the two segments and two sets of slots together form an inflow conduit section for passing solution to each vessel and an outflow conduit section for passing solution from the vessel.

5. An evaporator as claimed in claim 1, wherein the distributor means comprises a centrifugal circular distributor equipped with spray nozzles and inclined pivoting wiping blades.

6. An evaporator as claimed in claim 2, wherein the heating means comprises a heating coil on a bottom surface of the conical walls.

7. An evaporator as claimed in claim 6, (wherein each of the vessels comprises a heating coil and downwardly converging coaxial conical walls, said evaporator further comprising valve means for dividing vapor removed through the outlet means of said at least one vessel into at least two portions, first means for conveying a first of said portions to the heating coil in a conical wall of a succeeding vessel, and second means for conveying a second of said portions to the condenser means.

8. An evaporator as claimed in claim 7, wherein the condenser means comprises means for feeding the solution into the central conduit means, whereby vapor removed through the outlet means and conveyed to the condenser means is used to preheat solution as it is fed into the central conduit means.

9. An evaporator as claimed in claim 8, wherein the condenser means comprises an annulus vessel containing a spiral conduit, and said cylindrical wall forms an inner wall of the annulus vessel.

10. An evaporator as claimed in claim 7, wherein said valve means comprises two adjustable valves or one three-way valve.

11. An evaporator as claimed in claim 7, further comprising means for reducing the pressure in the interior space of said at least one vessel and rotating means, said central conduit means comprising a central tubular conduit which passes through each vessel, said tubular conduit being rotatable by said rotating means; said valve means, pressure reducing means, heating coil of said at least one vessel and rotating means selectively cooperating to provide the evaporator with a plurality of alternative operation modes for concentrating said solution.

12. An evaporator as claimed in claim 2, wherein the condenser means comprises a plurality of vertically stacked coaxial annular condensers having an inner cylindrical wall enclosing said vessels.

13. An evaporator as claimed in claim 12, wherein each annular condenser contains an annulus space containing at least two spiral conduits, a first of said spiral conduits for feeding said solution to said central conduit means and a second of said spiral conduits for carrying condensed vapor, said evaporator comprising external connection means for introducing said feed solution into the annular condensers.

14. An evaporator as claimed in claim 3, in which said rotating means comprises a turbine to rotate said central shaft.

15. An evaporator as claimed in claim 1 further comprising flashing means which comprise a plurality of spray nozzles mounted on the end of said radial conduit means for distributing the solution to the interior spaces of the vessels.

16. An evaporator as claimed in claim 5, wherein each wiping blade comprises a distorted L-shaped blade arm attached from a base to a rotating bracket through a pivot pin and adjustable spring.

17. An evaporator as claimed in claim 1, wherein said central conduit means comprises a plurality of tubular conduit segments, each tubular conduit segment being fixed from its upper end to one of the conical walls, a lower end of each tubular conduit section being coupled to said distributor means.

* * * * *